US008685594B2

(12) United States Patent
AlexandrovichSerov et al.

(10) Patent No.: US 8,685,594 B2
(45) Date of Patent: *Apr. 1, 2014

(54) CATALYST FOR CATHODE OF FUEL CELL, AND MEMBRANE-ELECTRODE ASSEMBLY FOR FUEL CELL

(75) Inventors: Alexey AlexandrovichSerov, Suwon-si (KR); Chan Kwak, Suwon-si (KR); Myoung-Ki Min, Suwon-si (KR); Si-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1043 days.

This patent is subject to a terminal disclaimer.

(21) Appl. No.: 11/515,321

(22) Filed: Aug. 31, 2006

(65) Prior Publication Data

US 2007/0128498 A1  Jun. 7, 2007

(30) Foreign Application Priority Data

Aug. 31, 2005 (KR) .......... 10-2005-0080602
Oct. 4, 2005 (KR) .......... 10-2005-0092862

(51) Int. Cl.
*H01M 4/02* (2006.01)

(52) U.S. Cl.
USPC ........... 429/526; 429/479; 429/483; 429/487; 429/485; 429/523; 429/524; 429/525; 429/527; 429/528; 429/532; 502/185; 502/216; 502/221; 502/223; 204/290.14; 204/290.01; 204/282; 204/283; 204/252

(58) Field of Classification Search
None
See application file for complete search history.

(56) References Cited

U.S. PATENT DOCUMENTS

| 5,902,916 | A | 5/1999 | Rühl et al. |
| 6,149,782 | A * | 11/2000 | Allen et al. ............. 204/290.14 |
| 6,239,065 | B1 | 5/2001 | Schulz et al. |
| 6,245,707 | B1 | 6/2001 | Chu et al. |
| 6,686,308 | B2 | 2/2004 | Mao et al. |
| 2004/0096728 | A1 | 5/2004 | Campbell |
| 2005/0031926 | A1 | 2/2005 | Sugimasa et al. |
| 2006/0116284 | A1* | 6/2006 | Pak et al. ..................... 502/180 |
| 2007/0078052 | A1* | 4/2007 | Grinberg et al. ............. 502/150 |
| 2008/0118816 | A1 | 5/2008 | Kwak et al. |
| 2008/0138693 | A1 | 6/2008 | Min et al. |
| 2008/0318106 | A1* | 12/2008 | Kwak et al. ..................... 429/30 |

FOREIGN PATENT DOCUMENTS

| CN | 1353777 A | 6/2002 |
| DE | 196 44 628 A 1 | 4/1998 |
| JP | 10-92441 | 4/1998 |
| JP | 2001-502467 | 2/2001 |

(Continued)

OTHER PUBLICATIONS

Reeve et al (Journal: "Methanol Tolerant Oxygen Reduction Catalysts Based on Transition Metal Sulfides", Electrochemical Society, vol. 145, No. 10, pp. 3463-3471, 1998).*

(Continued)

*Primary Examiner* — Melvin C Mayes
*Assistant Examiner* — Smita Patel
(74) *Attorney, Agent, or Firm* — Christie, Parker & Hale, LLP (57) ABSTRACT

A cathode catalyst for a fuel cell includes a carrier, and an active material including M selected from the group consisting of Ru, Pt, Rh, and combinations thereof, and Ch selected from the group consisting of S, Se, Te, and combinations thereof, with the proviso that the active material is not RuSe when the carrier is C.

16 Claims, 8 Drawing Sheets

(56) References Cited

FOREIGN PATENT DOCUMENTS

| | | |
|---|---|---|
| JP | 2001-93531 | 4/2001 |
| JP | 2002-532247 | 10/2002 |
| JP | 2005-515063 | 5/2005 |
| JP | 2005-224800 | 8/2005 |
| JP | 2005-322430 | 11/2005 |
| JP | 2006-26471 | 2/2006 |
| JP | 2006-252797 | 9/2006 |
| JP | 2006-269096 | 10/2006 |
| JP | 2007-042519 | 2/2007 |
| KR | 10-0542170 | 5/2006 |
| KR | 10-2006-0060707 | 6/2006 |
| KR | 10-2007-0037815 | 4/2007 |
| KR | 10-0706450 B1 | 4/2007 |
| KR | 10-0709198 B1 | 4/2007 |
| KR | 10-0766965 B1 | 10/2007 |
| WO | WO 2005/019511 A1 | 3/2005 |

OTHER PUBLICATIONS

Alonso-Vante et al (Journal: "The structure analysis of the active centers of Ru-containing electrocatalysts for the oxygen reduction. An in situ EXAFS study", Electrochemical Acta, vol. 47 pp. 3807-3817, 2002).*

Reeve, et al. *Methanol-tolerant oxygen reduction catalysts based on transition metal sulfides and their application to the study of methanol permeation*, Electrochimica Acta 45 (2000) pp. 4237-4250.

Patent Abstracts of Japan, Publication No. 10-092441; Date of Publication: Apr. 10, 1998; in the name of Masaru Yoshitake et al.

Patent Abstracts of Japan, Publication No. 2001-093531; Date of Publication: Apr. 6, 2001; in the name of Masaru Yoshitake et al.

Patent Abstracts of Japan, Publication No. 2005-322430; Date of Publication: Nov. 17, 2005; in the name of Yukiko Yamamoto et al.

Patent Abstracts of Japan, Publication No. 2006-026471; Date of Publication: Feb. 2, 2006; in the name of Emi Kawasumi.

European Search Report dated Jan. 5, 2009 for European Patent Application No. 06119734.9, completed Dec. 18, 2008.

R. W. Reeve, et al., "Methanol Tolerant Oxygen Reduction Catalysts Based on Transition Metal Sulfides," *J. Electrochem. Soc.*, vol. 145, No. 10, Jan. 1, 1998, pp. 3463-3471, Electrochemical Society, Manchester, New Hampshire, USA.

N. Alonso-Vante, et al., "The structure analysis of the active centers of Ru-containing electrocatalysts for the oxygen reduction. An in situ EXAFS study," *Electrochimica Acta*, vol. 47, No. 22-23, Aug. 30, 2002, pp. 3807-3814, Elsevier Science Publishers, Barking, GB.

SIPO Office action dated Dec. 18, 2009, for corresponding Chinese application 200610112368.2, with English translaiton.

U.S. Office action dated Jun. 23, 2011, for cross-reference U.S. Appl. No. 12/076,544, 16 pages.

EPO Office action dated Jul. 24, 2013 for corresponding European Patent application 06 119 734.9-1359, (6 pages).

* cited by examiner

CATALYST FOR CATHODE OF FUEL CELL, AND MEMBRANE-ELECTRODE ASSEMBLY FOR FUEL CELL

CROSS-REFERENCES TO RELATED APPLICATIONS

This application claims priority to and the benefit of Korean Patent Application Nos. 10-2005-0080602 and 10-2005-0092862 filed in the Korean Intellectual Property Office on Aug. 31, 2005 and Oct. 4, 2005, respectively, the entire contents of which are incorporated herein by reference.

BACKGROUND OF THE INVENTION

1. Field of the Invention

The invention relates to a cathode catalyst for a fuel cell and a membrane-electrode assembly. More particularly, the invention relates to a cathode catalyst having activity and selectivity for a reduction reaction of an oxidant and a membrane-electrode assembly.

2. Description of the Related Art

A fuel cell is a power generation system for producing electrical energy through an electrochemical redox reaction of an oxidant and a fuel such as hydrogen, or a hydrocarbon-based material such as methanol, ethanol, natural gas, and the like.

Such a fuel cell is a clean energy source that can replace fossil fuels. It includes a stack composed of unit cells and produces various ranges of power output. Since it has a four to ten times higher energy density than a small lithium battery, it has been utilized as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has an advantage of high energy density and high power, but it also has problems in the need to carefully handle hydrogen gas and the requirement of accessory facilities, such as a fuel reforming processor, for reforming methane or methanol, natural gas and the like in order to produce hydrogen as the fuel gas.

On the contrary, a direct oxidation fuel cell has a lower energy density than that of the gas-type fuel cell, but has the advantages of easy handling of the liquid-type fuel, a low operation temperature, and no need for additional fuel reforming processors. Therefore, it has been acknowledged as an appropriate system for a portable power source for small and common electrical equipment.

In the above-mentioned fuel cell system, the stack that generates electricity substantially includes several to many unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to an anode and adsorbed on catalysts of the anode and is oxidized to produce protons and electrons. The electrons are transferred to a cathode via an out-circuit, and the protons are also transferred to the cathode through the polymer electrolyte membrane. In addition, an oxidant is supplied to the cathode, and then the oxidant, protons, and electrons are reacted on catalysts of the cathode to produce electricity along with water.

SUMMARY OF THE INVENTION

One embodiment of the invention provides a cathode catalyst for a fuel cell having high activity and selectivity for an oxidant reduction.

Another embodiment of the invention provides a method for preparing a cathode catalyst.

Yet another embodiment of the invention provides a membrane-electrode assembly including the above cathode catalyst.

Still another embodiment of the invention provides a fuel cell system including the above catalyst.

According to one embodiment of the invention, a cathode catalyst is provided that includes a carrier and an active material including M selected from the group consisting of Ru, Pt, Rh, and combinations thereof, and Ch selected from the group consisting of S, Se, Te, and combinations thereof, with the proviso that the active material is not RuSe when the carrier is C.

According to yet another embodiment of a cathode catalyst is provided that includes a carrier and an active material including Ru and S. The active material has a nano-sized average particle size and is supported on the carrier.

According to still another embodiment of the invention, a cathode catalyst for a fuel cell is provided that includes a carbon-based material and at least one compound selected from the group consisting of $Pt_xS_{100-x}$, $Pt_xSe_{100-x}$, $Pt_xTe_{100-x}$, $Rh_xS_{100-x}$, $Rh_xSe_{100-x}$, $Rh_xTe_{100-x}$, and combinations thereof supported on the carbon-based material.

The cathode catalyst according to one embodiment is prepared as follows: a ruthenium compound and a sulfur solution are mixed, a carrier is added, the resultant mixture is refluxed and filtered, and the filtrate is subjected to heat treatment.

The cathode catalyst according to another embodiment is prepared as follows: a carbon-based material powder on which M is supported, where M is selected from the group consisting of Pt, Rh, and combinations thereof, and a chalcogen element powder selected from the group consisting of S, Se, Te, and combinations thereof, are mixed in a solvent, the mixture is refluxed and filtered, and the filtrate is dried and then heat treated.

According to yet another embodiment of the invention, a membrane-electrode assembly is provided that includes a cathode and an anode facing each other, and a polymer electrolyte membrane interposed therebetween. The cathode catalyst layer includes at least one catalyst selected from the cathode catalysts according to the embodiments above, and combinations thereof.

DETAILED DESCRIPTION OF EXEMPLARY EMBODIMENTS

Embodiments of the invention will hereinafter be described in detail with reference to the accompanying drawings.

According to one embodiment of the invention, a Ru-containing cathode catalyst substituted for a platinum-based catalyst generally used in cathodes is provided. The Ru-containing catalyst has excellent activity and stability for an oxygen reduction reaction.

According to an embodiment of the invention, the cathode catalyst includes a carrier and an active material including M selected from the group consisting of Ru, Pt, Rh, and combinations thereof, and Ch selected from the group consisting of S, Se, Te, and combinations thereof, with the proviso that the active material is not RuSe when the carrier is C.

According to another embodiment of the invention, the cathode catalyst includes Ru and S, and has a nano-sized average particle size. According to one embodiment, the cathode catalyst has an average particle size of 2 to 3 nm. When the catalyst has a particle size of less than 2 nm, the particles may aggregate with each other to become a large particle of more than 5 nm, while when it is more than 3 nm, catalyst activity may be decreased.

Since the catalyst according to the above embodiment of the invention has very small-sized particles and thereby the active surface area for catalyst activity is increased, catalyst activity is excellent. In particular, the catalyst has higher activity than that of a Ru-containing catalyst, which has been researched as a substitute for platinum.

The cathode catalyst according to one embodiment of the invention may be supported in a carrier. Suitable carriers include carbon such as activated carbon, DENKA BLACK acetylene black, Ketjenblack activated carbon, acetylene black, graphite, or inorganic material particulates such as alumina, silica, titania, and zirconia. The carbon can be generally used.

In an embodiment, in the catalyst of the cathode, the mole ratio of M and Ch ranges from 0.03 to 9. Within the above range of the mole ratio of M and Ch, catalyst activity is excellent. According another embodiment, in the catalyst of the cathode, the mole ratio of Ru and S ranges from 0.03 to 0.05. When the mole ratio of Ru and S is less than 0.03, resistance against poisoning by a fuel is lessened, whereas when it is more than 0.05, catalyst activity is lessened.

In one embodiment, the amount of Ru of the carrier ranges from 5 to 80 wt %. When the amount of Ru is less than 5 wt %, catalyst activity is low. However, when it is more than 80 wt %, the catalyst may have particles that are too large due to aggregation of the particles, and thereby catalyst activity may decrease.

The cathode catalyst for a fuel cell according to an embodiment may be prepared as follows.

First, a ruthenium compound and an elementary sulfur solution are mixed. The sulfur solution may be provided at a temperature ranging from 100 to 170° C. The solvent may include, but is not limited to, benzene, toluene, or xylene.

The ruthenium compound may include, but is not limited to ruthenium carbonyl or ruthenium acetyl acetonate.

A carrier is added to the mixture to prepare a mixture including the ruthenium and sulfur. The carrier may include a carrier described above.

The mixture is refluxed at 140 to 200° C. for 24 to 96 hours. The reflux product is then filtered. The resulting filtrate is dried and then heat treated.

The heat treatment process may be performed at 200 to 250° C. for 3 to 7 hours under a nitrogen atmosphere or a $H_2$ and $N_2$ mixed gas atmosphere. When the heat treatment is performed under a $H_2$ atmosphere, S may be reduced. Therefore, when it is performed under the $H_2$ and $N_2$ mixed gas atmosphere, an amount of $H_2$ is included at maximally 50 wt %, that is to say, the ratio of $H_2$ and $N_2$ is under the range of 1:1.

The cathode catalyst according to another embodiment of the invention may include a carbon-based material and at least one compound selected from the group consisting of $Pt_xS_{100-x}$, $Pt_xSe_{100-x}$, $Pt_xTe_{100-x}$, $Rh_xS_{100-x}$, $Rh_xSe_{100-x}$, $Rh_xTe_{100-x}$, and combinations thereof supported on the carbon-based material.

Pt and Rh may adsorb oxygen in air and bind to the oxygen. Such oxygen inhibits an active center of Pt and Rh for an oxidant reduction reaction and thereby makes the oxidant reduction reaction difficult, and promotes the oxidation reaction of a fuel.

S, Se, or Te that bind to the Pt or Rh prevent oxygen in the air from binding to the Pt or Rh, thereby promoting reduction of an oxidant and suppressing oxidation of a fuel. Such a cathode catalyst for a fuel cell according to the invention has excellent activity and selectivity for reduction of an oxidant.

Further, a cathode catalyst for a fuel cell according to an embodiment of the invention has an increased reaction area by being supported on a carbon-based material, and has improved activity and excellent conductivity. Examples of the carbon-based material include acetylene black, DENKA BLACK acetylene black, activated carbon, Ketjenblack activated carbon, graphite, carbon nanotube, carbon nanofiber, carbon nanowire, and combinations thereof, but are not limited thereto.

In one embodiment of the compound, x ranges from 10 to 95, and is preferably 40 to 90. When x is less than 10, catalyst activity may be diminished. When x is more than 95, it may have insufficient catalyst selectivity.

In an embodiment, the compound may be supported on a carrier in an amount of 40 to 80 wt % based on the total weight of a catalyst. According to one embodiment, the compound may be supported in an amount of 50 to 70 wt %. When the compound is supported in an amount of less than 40 wt %, catalyst activity may be diminished. However, when it is more than 80 wt %, a catalyst may have particles that are too large, and thereby may have diminished activity.

The carbon supported $Pt_xS_{100-x}$ particles may have a particle diameter ranging from 2 to 6 nm, and preferably 2 to 3 nm. When the particle diameter is less than 2 nm, it is difficult to prepare, whereas when it is more than 6 nm, the catalyst activity is lessened.

The cathode catalyst according to another embodiment is prepared as follows: a carbon-based material powder on which M is supported, where M is selected from the group consisting of Pt, Rh, and combinations thereof, and a chalcogen element powder selected from the group consisting of S, Se, Te, and combinations thereof are mixed in a solvent, the mixture is refluxed and filtered, and the filtrate is dried and then heat treated.

In one embodiment of the mixing step, benzene, toluene, or xylene may be used as a solvent. In another embodiment, the chalcogen element powder may be mixed in an amount of 0.01 to 0.1 g with respect to 1 g of the carbon-based material powder on which the M is supported. When the amount of chalcogen element powder is less than 0.01 g, required selectivity is not obtained. However, when it is more than 0.1 g, activity is lessened.

In an embodiment, the reflux is performed at 100 to 140° C. for 12 to 36 hours, and the drying may be performed at 70 to 90° C. for 2 to 30 hours.

In one embodiment, the heat treatment is performed at 200 to 350° C. for 2 to 6 hours under a nitrogen, helium, or argon atmosphere.

Through these processes, the cathode catalyst for a fuel cell of embodiments of the invention is prepared. The catalyst prepared by the above method that has an active material supported on a carrier has a particle size ranging from 2 to 3 nm and therefore has excellent activity.

A cathode catalyst according to the embodiment of the invention may be used suitably in a direct oxidation fuel cell. A direct oxidation fuel cell is a fuel cell where hydrocarbon-based fuels like methanol and ethanol are directly supplied to a stack without fuel reforming processors.

In the direct oxidation fuel cell, a phenomenon that occurs when a fuel that is injected to an anode is crossed over toward a cathode through an electrolyte membrane may diminish catalyst performance.

Platinum, which is commonly used as a cathode catalyst for a fuel cell due to its high activity of an oxidant reduction reaction, may be poisoned by crossed-over fuels, thereby inactivating it. Since the platinum has low selectivity, it may oxidize the crossed-over fuels and diminish cathode performance.

The catalyst prepared according to embodiments of the invention has improved properties which may include one or more of the properties of: high activity, high selectivity for a reduction reaction of an oxidant, and resistance to being inactivated by methanol. Therefore, it may be adopted in a direct oxidation fuel cell.

The membrane-electrode assembly according to one embodiment includes a cathode including the above cathode catalyst, an anode, and a polymer electrolyte membrane interposed therebetween.

Figure 1:
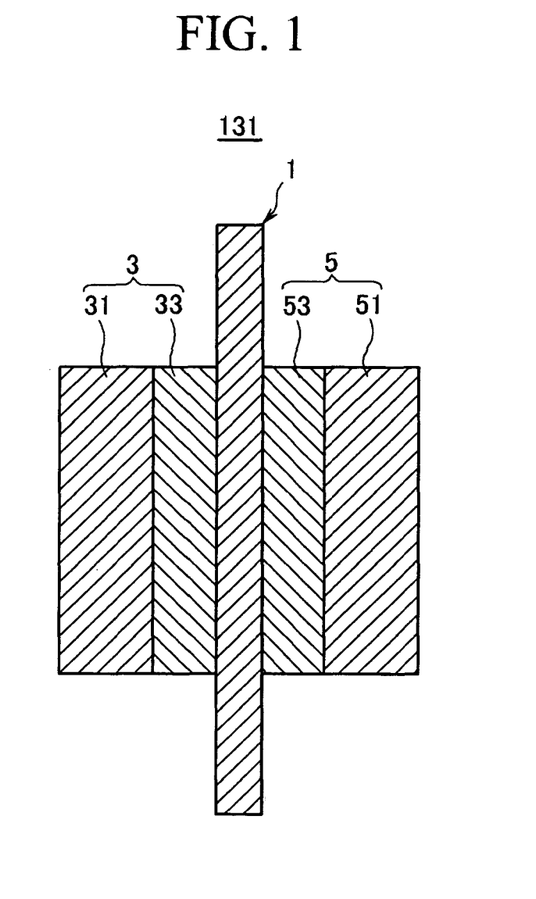
FIG. 1 is a schematic cross-sectional view of a membrane-electrode assembly according to one embodiment of the invention.

FIG. 1 is a schematic cross-sectional view showing a membrane-electrode assembly 131 according to one embodiment of the invention. Referring to the drawing, the membrane-electrode assembly 131 will be described.

The membrane-electrode assembly 131 generates electricity through fuel oxidation and oxidant reduction reactions, and a plurality of membrane-electrode assemblies form a stack.

At a cathode catalyst layer 53, an oxidant reduction reaction occurs. The cathode catalyst layer 53 may include catalysts according to the above embodiments of the invention, and combinations thereof. The cathode catalyst has excellent activity and/or selectivity for an oxidant reduction reaction and thereby improves performances of a cathode 5 and the membrane-electrode assembly 131 including the cathode catalyst.

At an anode catalyst layer 33 of an anode 3, a fuel oxidation reaction occurs and a platinum-based catalyst may be used to promote the oxidation reaction. Examples of the platinum-based catalysts include platinum, ruthenium, osmium, platinum-ruthenium alloys, platinum-osmium alloys, platinum-palladium alloys, platinum-M alloys, or combinations thereof, where M is a transition element selected from the group consisting of Ga, Ti, V, Cr, Mn, Fe, Co, Ni, Cu, Zn, and combinations thereof.

The anode catalyst can be supported on a carbon carrier or not supported as a black type. In an embodiment, suitable carriers include carbon such as graphite, DENKA BLACK acetylene black, Ketjenblack activated carbon, acetylene black, activated carbon, carbon nanotubes, carbon nanofibers, and carbon nanowire, or inorganic material particulates, such as alumina, silica, zirconia, and titania. According to one embodiment, carbon is used.

The catalyst layers 33, 53 of the anode 3 and cathode 5 are respectively disposed on electrode substrates 31, 51. Electrode substrates 31, 51 support an electrode, and also spread fuel and oxidant to the catalyst layers 33, 53 to help the fuel and oxidant to easily approach the catalyst layers 33 and 53. For the electrode substrates 31, 51, a conductive substrate is used, for example carbon paper, carbon cloth, carbon felt, or metal cloth (a porous film comprising metal cloth fiber or a metalized polymer fiber), but it is not limited thereto.

In an embodiment, a micro-porous layer (MPL) can be added between the electrode substrate 31, 51 and the catalyst layers 33, 53 to increase reactant diffusion effects. In general, the microporous layer may include, but is not limited to, a small sized conductive powder, such as a carbon powder, carbon black, acetylene black, activated carbon, carbon fiber, fullerene, nano-carbon, or combinations thereof. The nano-carbon may include a material such as carbon nanotubes, carbon nanofibers, carbon nanowire, carbon nanohorns, carbon nanorings, or combinations thereof. The microporous layer is formed by coating the conductive substrate with a composition including a conductive powder, a binder resin, and a solvent.

The binder resin may include, but is not limited to, polytetrafluoroethylene, polyvinylidenefluoride, polyvinylalcohol, celluloseacetate, and combinations thereof. The solvent may include, but is not limited to, an alcohol such as ethanol, isopropyl alcohol, ethyl alcohol, n-propyl alcohol, or butyl alcohol; water; dimethylacetamide; dimethylsulfoxide; and N-methylpyrrolidone. The coating method may include, but is not limited to, screen printing, spray coating, doctor blade methods, gravure coating, dip coating, silk screening, and painting, depending on the viscosity of the composition.

The polymer electrolyte membrane 1 exchanges ions, transferring protons generated in the anode catalyst layer 33 to the cathode catalyst layer 53, and thus, can include a highly proton-conductive polymer. The proton-conductive polymer may be any proton-conductive polymer resin that is generally used in a polymer electrolyte membrane of a fuel cell. In one embodiment, the proton-conductive polymer may be a polymer resin having a cation exchange group selected from the group consisting of a sulfonic acid group, a carboxylic acid group, a phosphoric acid group, a phosphonic acid group, and derivatives thereof, at its side chain.

In an embodiment, the proton-conductive polymer may include at least one polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In a preferred embodiment, the polymer electrolyte membrane includes proton conductive polymers selected from the group consisting of poly(perfluorosulfonic acid) (NAFION™), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole). In general, the polymer membrane has a thickness ranging from 10 to 200 μm.

A fuel cell system including the membrane-electrode assembly of the invention includes at least one electricity generating element, a fuel supplier, and an oxidant supplier.

In one embodiment, the electricity generating element includes a membrane-electrode assembly and separators disposed at each side of the membrane-electrode assembly. It generates electricity through oxidation of a fuel and reduction of an oxidant.

The fuel supplier plays a role of supplying the electricity generating element with a fuel including hydrogen and the oxidant supplier plays a role of supplying the electricity generating element with an oxidant such as oxygen or air. The fuel includes liquid or gaseous hydrogen, or a hydrocarbon-based fuel such as methanol, ethanol, propanol, butanol, or natural gas.

Figure 2:
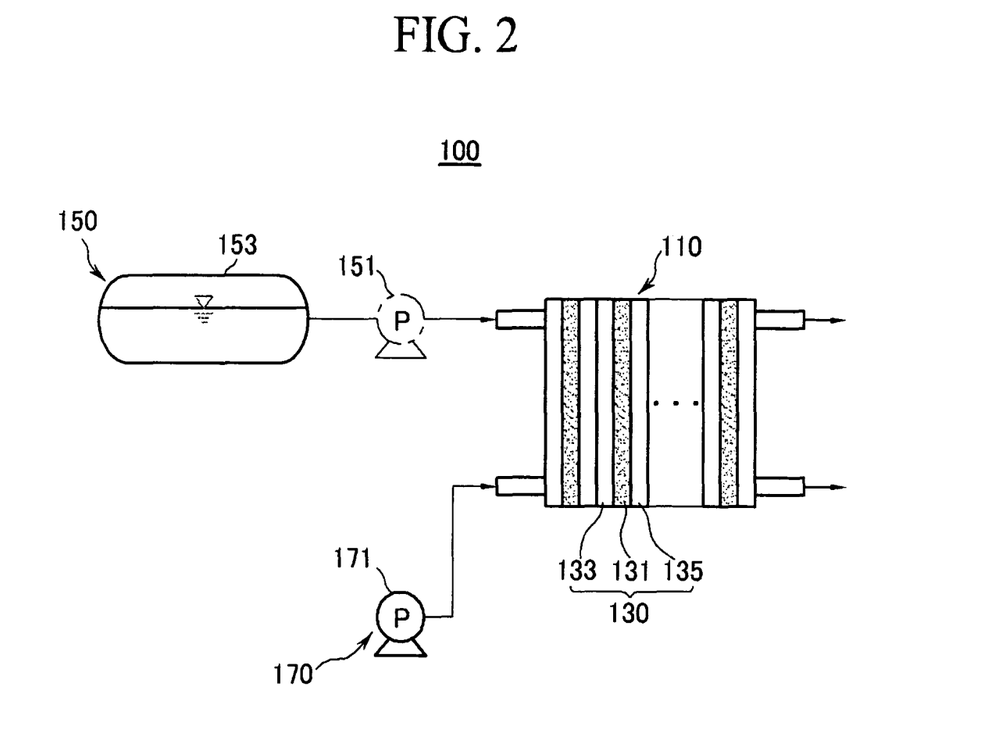
FIG. 2 schematically shows the structure of a fuel cell system according to one embodiment of the invention.

FIG. 2 shows a schematic structure of a fuel cell system 100 according to an embodiment of the invention that will be described in detail with reference to the accompanying drawing as follows. FIG. 2 illustrates a fuel cell system 100 wherein a fuel and an oxidant are provided to an electricity generating element 130 through pumps 151 and 171, but the invention is not limited to such a structure. The fuel cell system of the invention may alternatively include a structure wherein a fuel and an oxidant are provided in a diffusion manner.

The fuel cell system 100 includes a stack 110 including at least one electricity generating element 130 that generates electrical energy through an electrochemical reaction of a fuel and an oxidant, a fuel supplier 150 for supplying a fuel to the electricity generating element 130, and an oxidant supplier 170 for supplying the oxidant to the electricity generating element 130.

In addition, the fuel supplier 150 is equipped with a tank 153, which stores fuel, and a pump 151, which is connected therewith. The fuel pump 151 supplies the fuel stored in the tank 153 to the stack.

The oxidant supplier 170, which supplies the electricity generating element 130 of the stack 110 with the oxidant, is equipped with at least one pump 171 for supplying the oxidant to the stack.

The electricity generating element 130 includes a membrane-electrode assembly 131 that oxidizes hydrogen or a fuel and reduces an oxidant, separators 133, 135 that are respectively positioned at opposite sides of the membrane-electrode assembly 131 and supply hydrogen or a fuel, and an oxidant.

The cathode catalyst of the present invention can be applied to a polymer electrolyte fuel cell (PEMFC) and a direct oxidation fuel cell (DOFC). According to one embodiment, the cathode catalyst can be applied to a direct oxidation fuel cell (DOFC), particularly a direct methanol fuel cell (DMFC) using liquid methanol.

The following examples illustrate embodiments of the invention in more detail. However, it is understood that the invention is not limited by these examples.

Example 1

A sulfur benzene solution was added to 1 g of $Ru_3(CO)_{12}$ and then mixed. The sulfur benzene solution was prepared by adding 0.06 g of sulfur into 150 ml of benzene.

The mixture was allowed to stand for 1 hour, and 1 g of ketjen black carrier was added. The obtained mixture was refluxed at 100° C. for 48 hours. The refluxed product was filtered to obtain resulting filtrates, and the filtrates were dried at 80° C. for 24 hours. The dried product was heated at 250° C., under a nitrogen atmosphere to prepare a RuS/C cathode catalyst.

Comparative Example 1

A selenium benzene solution was added to 1 g of a $Ru_3(CO)_{12}$ and then mixed. The selenium benzene solution was prepared by adding 0.03 g of seleniuminto 150 ml of benzene.

The mixture was allowed to stand for 1 hour, and 1 g of ketjen black carrier was added. The obtained mixture was refluxed at 100° C. for 48 hours. The refluxed product was filtered to obtain resulting filtrate, and the filtrate was dried at 80° C. for 24 hours. The dried product was then heat treated at 300° C. under a hydrogen and nitrogen mixed gas atmosphere in a volume ratio of 1:1 to prepare a RuS/C cathode catalyst.

Figure 3A:
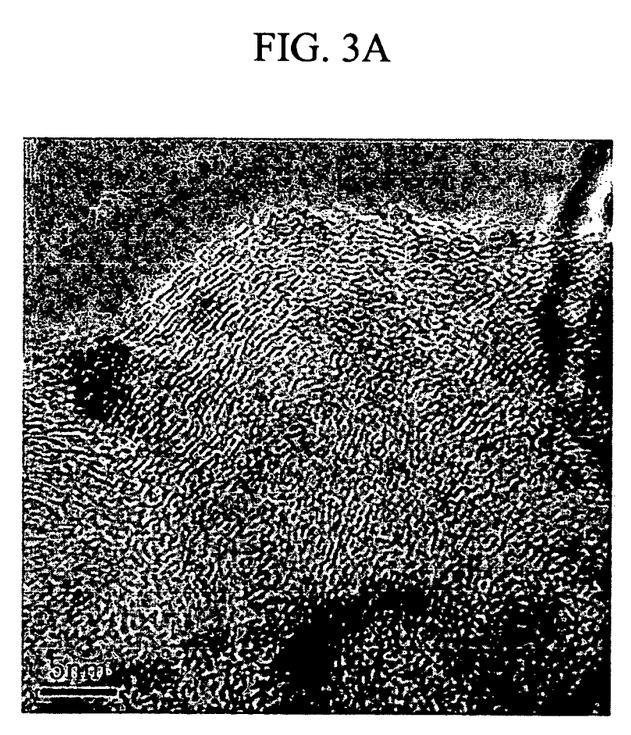
FIGS. 3A to 3C are SEM photographs of a cathode catalyst according to Example 1 of the invention.
Figure 3B:
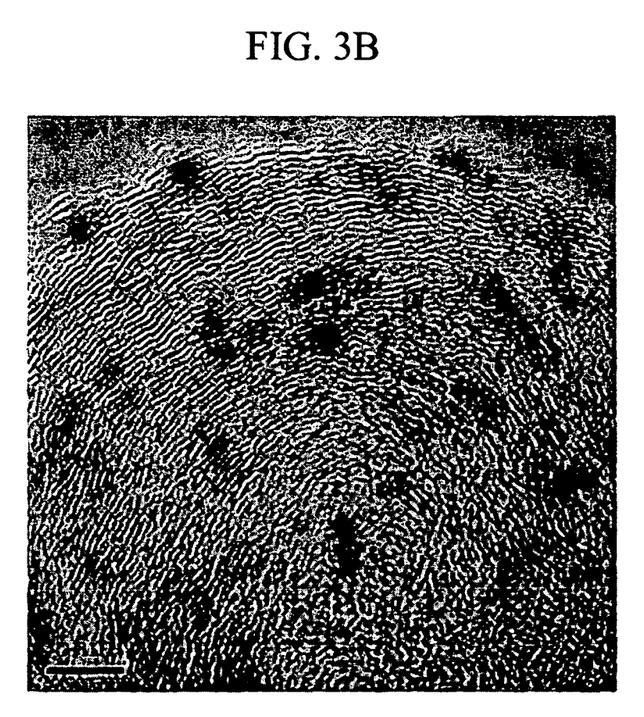
Figure 3C:
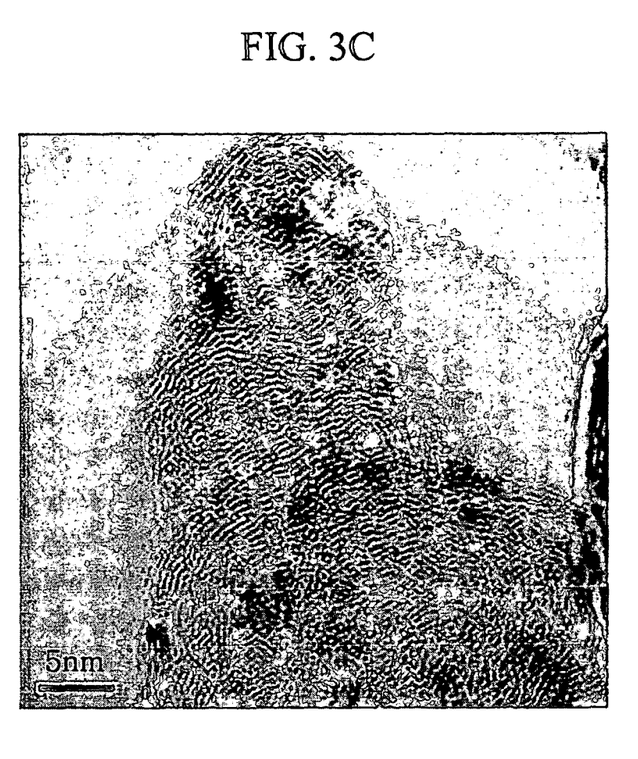

FIGS. 3A to 3C are SEM photographs of a cathode catalyst prepared according to Example 1 taken from various orientations and various magnifications. The scale bar of FIGS. 3A to 3C represents 5 nm. According to the darkest parts of FIGS. 3A to 3C, the size of a cathode catalyst of the Example 1 is 2 to 3 nm.

The catalytic activity of the catalysts according to Example 1 and Comparative Example 1 was measured using a Rotating Disk Electrode.

Figure 4:
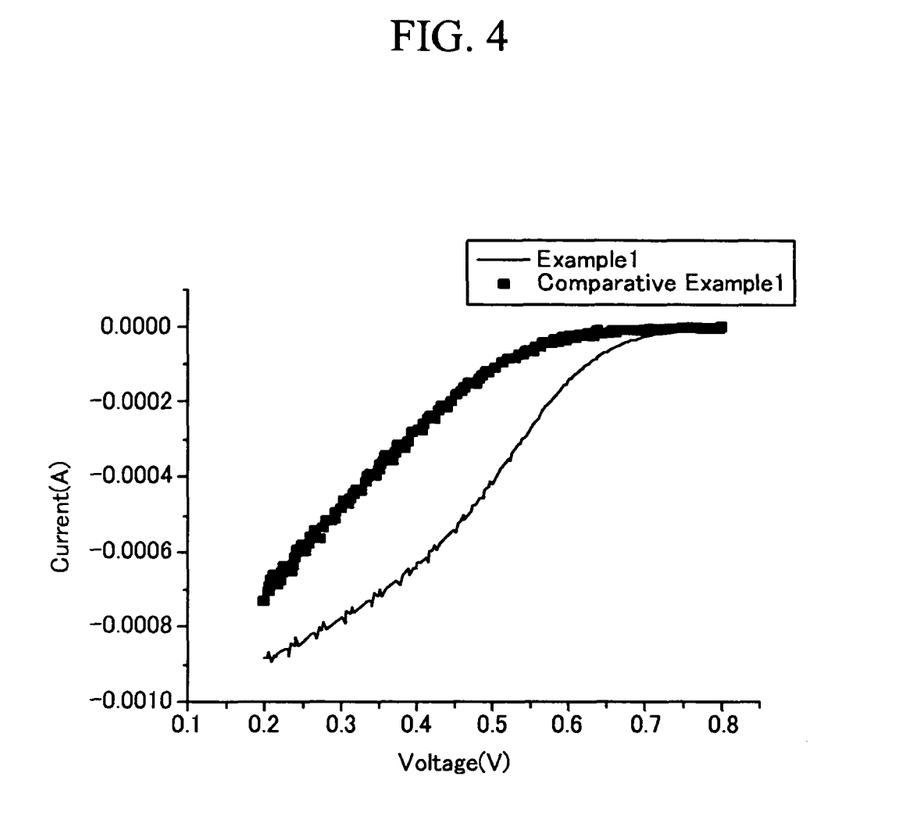
FIG. 4 is a graph showing a measurement result using a Rotating Disk Electrode (RDE) of cathode catalysts according to Example 1 and Comparative Example 1.

Ag/AgCl was used as a reference electrode, Pt was used as a counter electrode, and a 0.5 M sulfuric acid solution was used. The activity was measured at 10 mV/s of a scan rate and 2000 rpm of a rotating speed. FIG. 4 shows the result. As shown in FIG. 4, the RuS catalyst according to Example 1 has more activity compared to the RuSe catalyst according to Comparative Example 1.

Example 2

1 g of Pt/C supported in an amount of 60% and 0.004 g of a sulfur powder were added to 100 ml of a benzene solvent, then agitated for 30 minutes and then refluxed at 120° C. for 24 hours.

The obtained solution was filtered, and the resulting filtrate was dried at 90 for 4 hours. The dried sample was heat treated under a hydrogen gas atmosphere at 250° C. for 3 hours to prepare a cathode catalyst PtS/C for a fuel cell.

To examine catalytic activity of the catalyst according to Example 2, an oxygen saturated sulfuric acid solution was prepared by bubbling an oxygen gas for 2 hours in a 0.5 M sulfuric acid solution. Working electrodes were prepared by loading $3.78 \times 10^{-3}$ mg of the catalyst according to Example 2 on glassy carbons, respectively, and a platinum mesh was used as a counter electrode. The working and counter electrodes were put in the sulfuric acid solution and a current was measured while changing the voltage. The measurement results are shown in FIG. 5.

To examine selectivity of the catalyst according to Example 2, an oxygen saturated sulfuric acid solution was prepared by bubbling an oxygen gas for 2 hours in a solution including 0.5 M sulfuric acid and 1 M methanol. Working electrodes were prepared by loading $3.78 \times 10^{-3}$ mg of the catalyst according to Example 2 on glassy carbons, respectively, and a platinum mesh was used as a counter electrode. The working and counter electrodes were put in the sulfuric acid solution, and a current was measured while changing the voltage. The measurement results are shown in FIG. 6.

Figure 5:
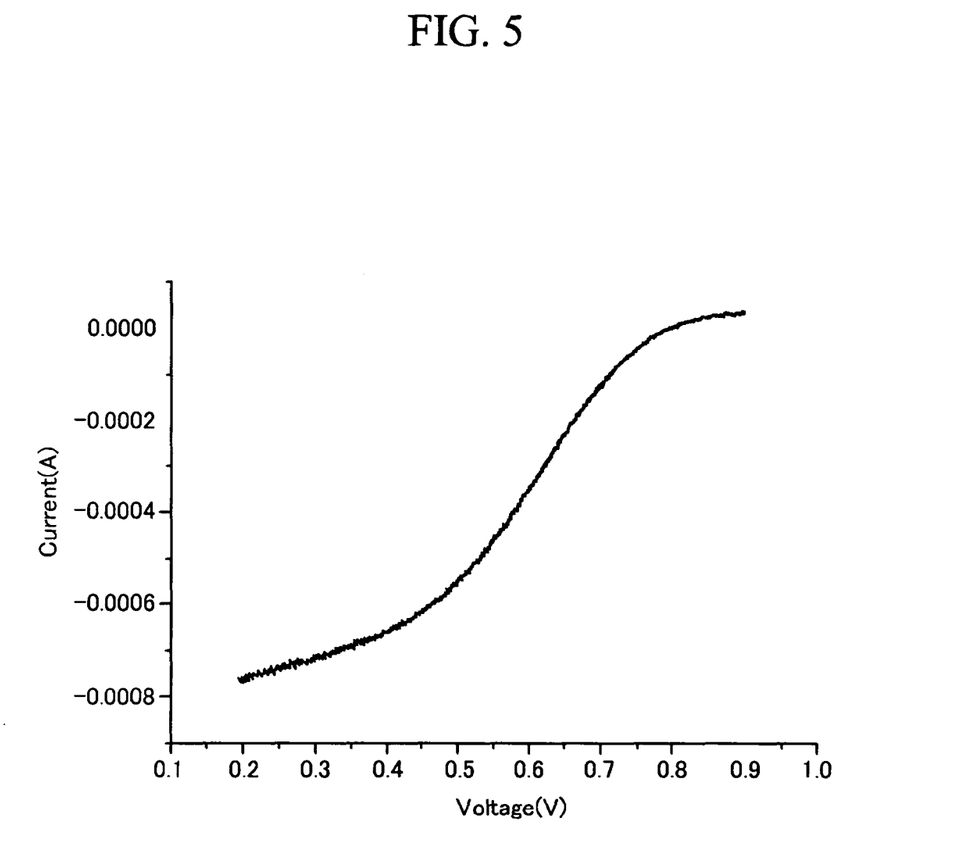
FIG. 5 is a graph showing activity of the catalyst according to Example 2.
Figure 6:
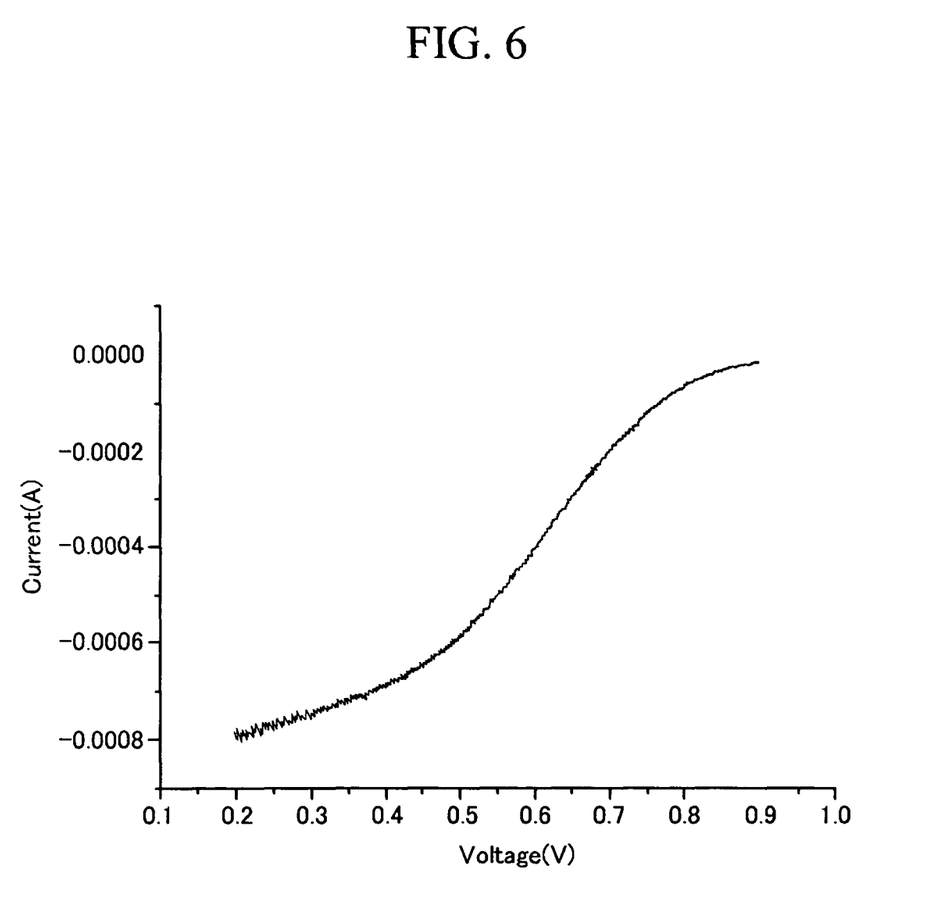
FIG. 6 is a graph showing selectivity of the catalyst according to Example 2.

FIG. 5 shows that a catalyst prepared by Example 2 has high activity for an oxygen reduction reaction, and FIG. 6 shows that the activity for an oxygen reduction reaction may not be diminished when methanol is present.

The cathode catalysts of the invention have a very small average particle diameter, and have high activity and selectivity for an oxidant reduction.

While this invention has been described in connection with what is considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cathode catalyst for a fuel cell, comprising:
   a carrier; and
   an active material selected from the group consisting of RuS, $Pt_xS_{100-x}$, $Pt_xTe_{100-x}$, $Rh_xS_{100-x}$, $Rh_xTe_{100-x}$, and combinations thereof, wherein x is in the range of 10 to 95, wherein when the active material is RuS, the mole ratio of S with respect to Ru is in the range of 0.03 to 0.05, wherein the carrier is a carbon-based material and the active material is supported on the carbon-based material, and wherein the active material is not less than 40 wt % with respect to the total weight of the cathode catalyst.

2. The cathode catalyst of claim 1, wherein the active material is RuS, and the active material has a nano-sized average particle size.

3. The cathode catalyst of claim 2, wherein the catalyst has an average particle size of 2 to 3 nm.

4. The cathode catalyst of claim 1, wherein Ru, Pt and Rh are in the range of 5 to 80 wt % with respect to the weight of the carrier.

5. The cathode catalyst of claim 1, wherein x is in the range of 40 to 90.

6. The cathode catalyst of claim 1, wherein the active material is provided in an amount in the range of 40 to 80 wt % with respect to the total weight of the cathode catalyst.

7. The cathode catalyst of claim 6, wherein the active material is provided in an amount in the range of 50 to 70 wt % with respect to the total weight of the cathode catalyst.

8. The cathode catalyst of claim 1, wherein the active material has a particle diameter in the range of 2 to 6 nm.

9. The cathode catalyst of claim 8, wherein the active material has a particle diameter in the range of 2 to 3 nm.

10. The cathode catalyst of claim 1, wherein the carbon-based material is selected from the group consisting of acetylene black, activated carbon, graphite, carbon nanotubes, carbon nanofibers, carbon nanowire, and combinations thereof.

11. The cathode catalyst of claim 1, wherein the active material is selected from the group consisting of RuS, $Rh_xTe_{100-x}$, and combinations thereof, wherein x is in the range of 10 to 95, and wherein when the active material is RuS, the mole ratio of S with respect to Ru is in the range of 0.03 to 0.05.

12. The cathode catalyst of claim 1, wherein the active material is RuS.

13. A cathode catalyst for a fuel cell, comprising:
    a carrier; and
    an active material selected from the group consisting of RuS, $Rh_xS_{100-x}$, $Rh_xTe_{100-x}$, and combinations thereof, wherein x is in the range of 10 to 95, wherein when the active material is RuS, the mole ratio of S with respect to Ru is in the range of 0.03 to 0.05, wherein the carrier is a carbon-based material and the active material is supported on the carbon-based material, and wherein the active material is not less than 40 wt % with respect to the total weight of the cathode catalyst.

14. A membrane-electrode assembly for a fuel cell, comprising a polymer electrolyte membrane with a cathode and an anode on either side, wherein the cathode comprises a cathode catalyst comprising:
    a carrier; and
    an active material selected from the group consisting of RuS, $Pt_xS_{100-x}$, $Pt_xTe_{100-x}$, $Rh_xS_{100-x}$, $Rh_xTe_{100-x}$, and combinations thereof, wherein x is in the range of 10 to 95, wherein when the active material is RuS, the mole ratio of S with respect to Ru is in the range of 0.03 to 0.05, wherein the carrier is a carbon-based material and the active material is supported on the carbon-based material, and wherein the active material is not less than 40 wt % with respect to the total weight of the cathode catalyst.

15. The membrane-electrode assembly of claim 14, wherein when the active material is RuS, the active material has a nano-sized average particle size.

16. The membrane-electrode assembly of claim 14, wherein the fuel cell is a direct oxidation fuel cell.

* * * * *